United States Patent
Yamamoto et al.

(10) Patent No.: US 9,466,854 B2
(45) Date of Patent: Oct. 11, 2016

(54) NONAQUEOUS ELECTROLYTE SECONDARY BATTERY AND METHOD FOR MANUFACTURING THE SAME

(71) Applicant: Kabushiki Kaisha Toshiba, Minato-ku (JP)

(72) Inventors: Dai Yamamoto, Yokohama (JP); Shinsuke Matsuno, Tokyo (JP); Hidesato Saruwatari, Saku (JP); Hiroko Watando, Tokyo (JP); Sayaka Morimoto, Tokyo (JP); Kazuya Kuriyama, Saku (JP); Hideki Satake, Saku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 654 days.

(21) Appl. No.: 13/934,673

(22) Filed: Jul. 3, 2013

(65) Prior Publication Data
US 2014/0011082 A1    Jan. 9, 2014

(30) Foreign Application Priority Data

Jul. 4, 2012 (JP) ................ 2012-150392
Jun. 27, 2013 (JP) ................ 2013-135296

(51) Int. Cl.
| | |
|---|---|
| *H01M 10/056* | (2010.01) |
| *H01M 4/48* | (2010.01) |
| *H01M 10/0525* | (2010.01) |
| *H01M 10/0567* | (2010.01) |
| *H01M 10/0568* | (2010.01) |
| *H01M 10/058* | (2010.01) |
| *H01M 4/485* | (2010.01) |

(52) U.S. Cl.
CPC ........... *H01M 10/056* (2013.01); *H01M 4/485* (2013.01); *H01M 10/058* (2013.01); *H01M 10/0525* (2013.01); *H01M 10/0567* (2013.01); *H01M 10/0568* (2013.01); *H01M 2300/0025* (2013.01); *Y02E 60/122* (2013.01); *Y02P 70/54* (2015.11); *Y10T 29/4911* (2015.01); *Y10T 29/49108* (2015.01)

(58) Field of Classification Search
None
See application file for complete search history.

(56) References Cited

U.S. PATENT DOCUMENTS

| | | | |
|---|---|---|---|
| 2010/0015514 A1* | 1/2010 | Miyagi | ............... H01M 10/052 429/129 |
| 2011/0223089 A1 | 9/2011 | Nishida et al. | |
| 2011/0223488 A1 | 9/2011 | Nishida et al. | |
| 2013/0011726 A1 | 1/2013 | Takano et al. | |

FOREIGN PATENT DOCUMENTS

| | | | |
|---|---|---|---|
| EP | 2 166 611 A1 | | 3/2010 |
| EP | 2 523 240 A1 | | 11/2012 |
| JP | 11-67270 | | 3/1999 |
| JP | 2007165125 A | * | 6/2007 |
| JP | 2007173180 A | * | 7/2007 |
| JP | 2007-214120 | | 8/2007 |
| JP | 2008-277000 | | 11/2008 |
| WO | WO 2011/083861 A1 | | 7/2011 |

OTHER PUBLICATIONS

Extended European Search Report issued May 30, 2014, in European Patent Application No. 13175045.7.

* cited by examiner

*Primary Examiner* — Gregg Cantelmo
(74) *Attorney, Agent, or Firm* — Oblon, McClelland, Maier & Neustadt, L.L.P

(57) ABSTRACT

According to one embodiment, there is provided a nonaqueous electrolyte secondary battery including a positive electrode, a negative electrode containing a titanium-containing oxide, and a nonaqueous electrolyte. The nonaqueous electrolyte contains carbon monoxide and at least one selected from difluorophosphoric acid and monofluorophosphoric acid. The ratio of the mass concentration of carbon monoxide to the sum of the mass concentrations of difluorophosphoric acid and monofluorophosphoric acid is in the range of 0.1 to 5%.

6 Claims, 1 Drawing Sheet

NONAQUEOUS ELECTROLYTE SECONDARY BATTERY AND METHOD FOR MANUFACTURING THE SAME

CROSS-REFERENCE TO RELATED APPLICATIONS

This application is based upon and claims the benefit of priority from Japanese Patent Application No. 2012-150392, filed Jul. 4, 2012, the entire contents of which are incorporated herein by reference.

FIELD

Embodiments described herein relate generally to a nonaqueous electrolyte secondary battery and a method for manufacturing the same.

BACKGROUND

When a battery is brought into a highly charged state, a self-discharge is caused on the surface of an electrode, which causes a decomposition reaction of an electrolyte solution. An oxidation reaction is caused on the surface of a positive electrode, which generates an oxidized gas (for example, carbon dioxide). A reduction reaction is caused on the surface of a negative electrode, which generates a reduced gas (for example, hydrogen and carbon monoxide). When the gas is generated, the battery is swollen, which increases internal resistance. As a result, the capacity of the battery is disadvantageously decreased.

DETAILED DESCRIPTION

Figure 1:
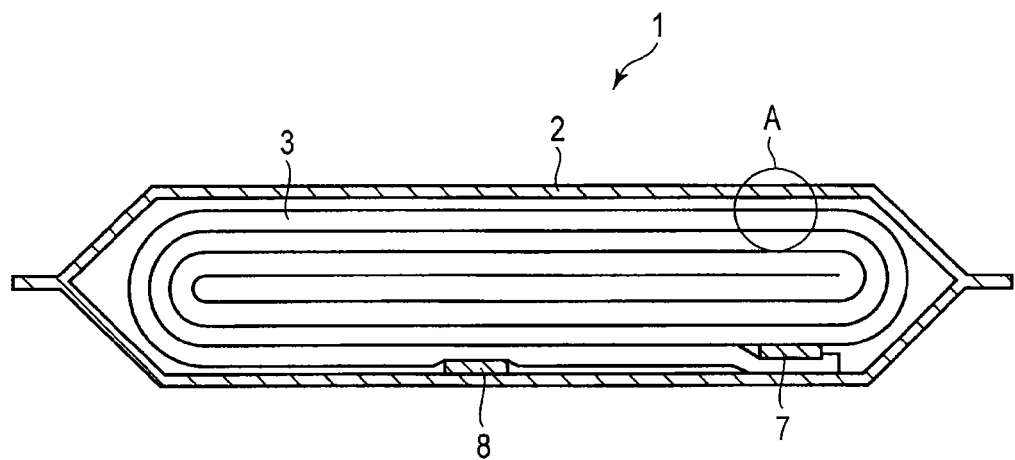
FIG. 1 is a sectional view of a nonaqueous electrolyte battery according to a first embodiment.

In general, according to one embodiment, there is provided a nonaqueous electrolyte secondary battery including: a positive electrode; a negative electrode containing a titanium-containing oxide; and a nonaqueous electrolyte. The nonaqueous electrolyte contains carbon monoxide and at least one selected from difluorophosphoric acid and monofluorophosphoric acid. The ratio of the mass concentration of carbon monoxide to the sum of the mass concentrations of difluorophosphoric acid and monofluorophosphoric acid is in the range of 0.1 to 5%.

According to another embodiment, there is provided a method for manufacturing a nonaqueous electrolyte secondary battery comprising preparing a nonaqueous electrolyte under an inert gas atmosphere excluding carbon dioxide; dissolving at least one selected from difluorophosphoric acid, monofluorophosphoric acid, and salts thereof in the nonaqueous electrolyte under the inert gas atmosphere; adjusting a mass concentration of carbon monoxide in the nonaqueous electrolyte to the range of 0.1 to 5% based on a sum of mass concentrations of difluorophosphoric acid and monofluorophosphoric acid under the inert gas atmosphere; and assembling the nonaqueous electrolyte secondary battery using the nonaqueous electrolyte.

According to further embodiment, there is provided a method for manufacturing a nonaqueous electrolyte secondary battery comprising preparing a nonaqueous electrolyte under an inert gas atmosphere excluding carbon dioxide; dissolving raw materials of at least one of difluorophosphoric acid and monofluorophosphoric acid in the nonaqueous electrolyte under the inert gas atmosphere; assembling a temporarily sealed battery using the nonaqueous electrolyte under the inert gas atmosphere; storing the temporarily sealed battery at high temperature to generate at least one of the difluorophosphoric acid and the monofluorophosphoric acid in the nonaqueous electrolyte; adjusting a mass concentration of carbon monoxide in the nonaqueous electrolyte to the range of 0.1 to 5% based on a sum of mass concentrations of difluorophosphoric acid and monofluorophosphoric acid; and permanently sealing the temporarily sealed battery.

According to the embodiments, the ratio of a mass concentration of carbon monoxide to a sum of mass concentrations of difluorophosphoric acid and monofluorophosphoric acid in the nonaqueous electrolyte is in the range of 0.1 to 5%.

Hereinafter, embodiments will be described with reference to the drawings. The same reference numerals denote common constitutions throughout the embodiments and overlapped description is not repeated. Each drawing is a pattern diagram to facilitate the description of the embodiments and its understanding. The shape, size, and ratio thereof or the like are different from those of an actual device. However, they can be appropriately designed and modified by taking into consideration the following description and known techniques.

First Embodiment

Figure 2:
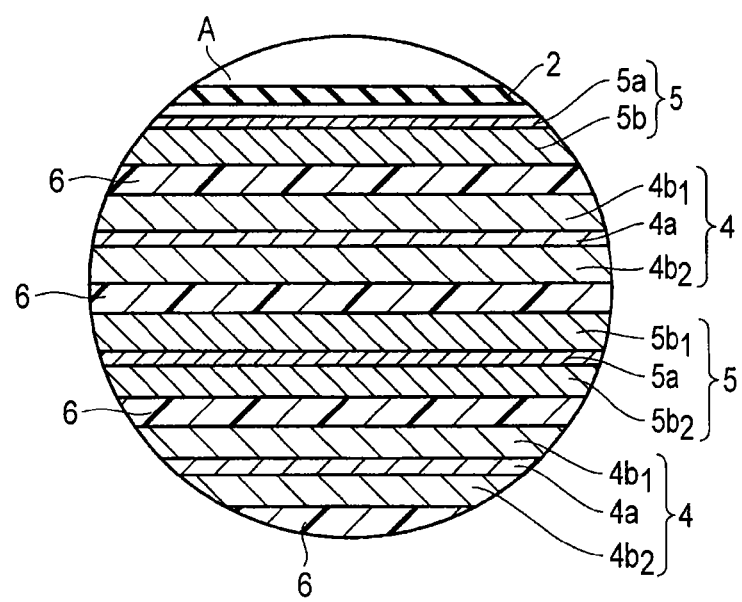
FIG. 2 is an enlarged sectional view of a portion A in FIG. 1.

A nonaqueous electrolyte secondary battery according to a first embodiment will be described with reference to the drawings. FIG. 1 is a schematic sectional view of a flat-type nonaqueous electrolyte secondary battery. FIG. 2 is an enlarged sectional view of a portion A in FIG. 1.

A battery 1 includes a container 2 and an electrode group 3 accommodated in the container 2. Herein, a wound electrode group is used as the electrode group 3. The container 2 has a baggy shape. A nonaqueous electrolyte (not shown) is further included in the container 2.

The electrode group 3 includes a positive electrode 4, a negative electrode 5, and a plurality of separators 6, as shown in FIG. 2. The electrode group 3 is formed by spirally winding a laminated product. The laminated product is not limited thereto. However, the laminated product is obtained by laminating the separator 6, the positive electrode 4, the separator 6, and the negative electrode 5 in this order. The flat-type wound electrode group is produced by spirally winding the laminated product such that the negative electrode is located at the outermost periphery, and thereafter hot-pressing the wound laminated product.

The positive electrode 4 contains a positive electrode current collector 4a and positive electrode active material-containing layers (hereinafter, referred to as a "positive electrode layer") $4b_1$ and $4b_2$ formed on both surfaces of the positive electrode current collector 4a. The positive electrode layer 4b contains a positive electrode active material, a binder, and optionally a conductive agent.

Various oxides, sulfides, and polymers or the like can be used as the positive electrode active material.

Examples of the oxides and the sulfides include oxides into which lithium ion can be inserted such as manganese dioxide ($MnO_2$), iron oxide, copper oxide, and nickel oxide, lithium manganese composite oxides (for example, $Li_xMn_2O_4$ or $Li_xMnO_2$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium manganese cobalt composite oxides (for example, $Li_xMn_yCo_{1-y}O_2$), lithium manganese nickel composite oxides including a spinel structure (for example, $Li_xMn_{2-y}Ni_yO_4$), lithium phosphorus oxides having an olivine structure (for example, $Li_xFePO_4$, $Li_xFe_{1-y}Mn_yPO_4$, and $Li_xCoPO_4$), iron sulfates ($Fe_2(SO_4)_3$), vanadium oxides (for example, $V_2O_5$), and lithium nickel cobalt manganese composite oxides. In the above formulae, x and y satisfy the relationships represented by the inequalities of $0<x\leq1$ and $0<y\leq1$. As the active material, the above-described compounds can be used alone or in combination therewith.

Examples of the polymers include conductive polymer materials such as polyaniline and polypyrrole, or disulfide-based polymer materials.

Sulfur (S) or carbon fluoride can also be used as the positive electrode active material.

A compound having a high potential is more preferably used as the positive electrode active material. Examples of the compound include lithium manganese composite oxides (for example, $Li_xMn_2O_4$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium-manganese-nickel composite oxides having a spinel structure (for example, $Li_xMn_{2-y}Ni_yO_4$), lithium manganese cobalt composite oxides (for example, $Li_xMn_yCo_{1-y}O_2$), lithium iron phosphates (for example, $Li_xFePO_4$), and lithium nickel cobalt manganese composite oxides. Preferably, in the above formula, x and y preferably satisfy the relationships represented by $0<x\leq1$ and $0<y\leq1$.

When an ordinary-temperature molten salt is used as the nonaqueous electrolyte of the battery, preferable examples of the active material include lithium iron phosphate, $Li_xVPO_4F$ ($0\leq x\leq1$), lithium manganese composite oxides, lithium nickel composite oxides, and lithium nickel cobalt composite oxides. Because the reactivity of each of the compounds and the ordinary-temperature molten salt is reduced, cycle performance can be improved.

The positive electrode active material can contain any of the above compounds alone, or may contain two or more of the compounds. The positive electrode active material can further contain other one or more oxides. In this case, the ratio of the above-described active material to the total mass of the positive electrode active material is preferably 50% by mass or more.

The specific surface area of the positive electrode active material is preferably 0.1 $m^2$/g to 10 $m^2$/g. When the specific surface area is 0.1 $m^2$/g or more, the insertion site of lithium ions can be sufficiently ensured. When the specific surface area is 10 $m^2$/g or less, the handling in the manufacturing process is made easy and good charge and discharge cycle performance is obtained.

The binder is used to bind the active material, the conductive agent, and the positive electrode current collector 4a. Examples of the binder include polytetrafluoroethylene (PTFE), polyvinylidene fluoride (PVdF), and fluorine-based rubber.

The conductive agent is used if needed to improve the current collection performance and suppress the contact resistance of the active material and the positive electrode current collector 4a. Examples of the conductive agent include carbonaceous materials such as acetylene black, carbon black, and graphite.

The active material and the binder are respectively contained at ratios of 80% by mass or more and 98% by mass or less, and 2% by mass or more and 20% by mass or less in the positive electrode material layer.

When the content of the binder is 2% by mass or more, sufficient electrode strength is obtained. Because the binder is an insulating material, the content of the binder is preferably 20% by mass or less. Thus, the increase in the internal resistance can be prevented.

When the conductive agent is added, the active material, the binder, and the conductive agent are respectively blended at ratios of 77% by mass or more and 95% by mass or less, 2% by mass or more and 20% by mass or less, and 3% by mass or more and 15% by mass or less.

When the content of the conductive agent is 3% by mass or more, the above effects can be exerted. When the content is 15% by mass or less, decomposition of the nonaqueous electrolyte caused on the surface of the conductive agent when the battery is stored at high temperature can be reduced.

The positive electrode current collector 4a is preferably an aluminum foil or an aluminum alloy foil containing one or more elements selected from the group containing of Mg, Ti, Zn, Ni, Cr, Mn, Fe, Cu, and Si.

The thickness of the positive electrode current collector 4a is preferably in the range of 5 to 20 μm, and more preferably 15 μm or less. The purity of the aluminum foil is preferably 99% by mass or more. The content of transition metals such as Fe, Cu, Ni, and Cr contained in the aluminum foil or the aluminum alloy foil is preferably 1% by mass or less.

The positive electrode is produced by, for example, the following method. A positive electrode active material, a binder, and a conductive agent are suspended in a suitable solvent to prepare a slurry. The slurry is applied to a surface of a positive electrode current collector, followed by drying to form a positive electrode layer. Thereafter, the resultant layer is pressed. Alternatively, the positive electrode may be produced by forming a pellet from the positive electrode active material, the binder, and the conductive agent, to use the pellet as the positive electrode layer, and disposing the positive electrode layer on the positive electrode current collector.

The negative electrode 5 includes a negative electrode current collector 5a and negative electrode active material-containing layers (hereinafter, referred to as a "negative electrode layer") $5b_1$ and $5b_2$ formed on both surfaces of the negative electrode current collector 5a. However, in a portion located at the outermost periphery of the electrode group 3, as shown in FIG. 2, the negative electrode layer 5b is formed on the only inner surface of the negative electrode current collector 5a. The negative electrode layer 5b includes a negative electrode active material, a binder, and a conductive agent.

A titanium-containing oxide is used as the negative electrode active material. Examples of the titanium-containing oxide include lithium-titanium oxides having a spinel structure (for example, $Li_{4+x}Ti_5O_{12}$, x satisfies the relationship represented by the inequality of $0\leq x\leq3$), lithium-titanium oxides having a ramsdellite structure (for example, $Li_{2+y}Ti_3O_7$, y satisfies the relationship represented by the inequality of $0\leq y\leq3$), lithium-titanium composite oxides obtained by substituting a heterologous element for a part of the constituting elements of the lithium-titanium oxide, titanium oxides into which lithium ion can be inserted (for example, $TiO_2$), and titanium-containing metal composite oxides containing Ti and at least one element selected from the group containing of P, V, Sn, Cu, Ni, Fe, and Co. Examples of $TiO_2$ include bronze, anatase, rutile, or brookite titanium oxides. Titanium composite oxides having the crystal structure of monoclinic titanium dioxide (monoclinic β-type titanium composite oxides) can also be used.

The lithium-titanium oxides having a spinel structure ($Li_{4+x}Ti_5O_{12}$, x satisfies the relationship represented by the inequality of $0 \leq x \leq 3$) are more preferably used as the negative electrode active material. Thus, a battery including an excellent cycle life and high safety can be provided. The battery including the lithium-titanium oxide having the spinel structure generates a large amount of gas in a highly charged state at high temperature. Consequently, in the battery, the effect of the present embodiment can be more significantly obtained.

The negative electrode active material can contain other compound with the titanium-containing oxide. In such a case, the ratio of the total mass of the titanium-containing oxide to the total mass of the negative electrode active material is preferably 50% by mass or more.

The negative electrode active material preferably has an average particle size of 1 μm or less and a specific surface area falling within the range of 5 to 50 $m^2/g$ as determined by the BET method utilizing gaseous $N_2$ adsorption. The negative electrode active material having the average particle size and the specific surface area described above, exhibits a high utilization rate, and has an increased substantial capacity. The above specific surface area can be measured by using Micromeritics ASPA-2010 manufactured by Shimadzu Corporation, for example, and using $N_2$ as an absorption gas.

The binder is used if needed to bind the active material, the conductive agent, and the negative electrode current collector 5a. Examples of the binder include polytetrafluoroethylene (PTFE), polyvinylidene fluoride (PVdF), fluorine-based rubber, and styrene butadiene rubber.

The conductive agent is used if needed to improve the current collection performance and suppress the contact resistance of the active material and the negative electrode current collector 5a. Examples of the conductive agent include a carbonaceous material such as acetylene black, carbon black, or graphite.

Preferably, the negative electrode active material, the conductive agent, and the binder are respectively blended at ratios of 70% by mass or more and 96% by mass or less, 2% by mass or more and 28% by mass or less, and 2% by mass or more and 28% by mass or less in the negative electrode layer 5b. When the content of the conductive agent is 2% by mass or more, the current collection performance of the negative electrode layer can be improved. When the content of the binder is 2% by mass or more, the binding property of the negative electrode layer and the current collector can be sufficiently obtained. Therefore, cycle performance can be improved. On the other hand, from the viewpoint of a high capacity, each of the contents of the conductive agent and the binder is preferably 28% by mass or less.

The negative electrode current collector 5a is preferably made of a material which is electrochemically stable within in a potential range in which the lithium ions are inserted and released in the negative electrode active material. Examples of the material include copper, nickel, stainless steel, aluminum, and an aluminum alloy. The aluminum alloy preferably contains one or more elements selected from Mg, Ti, Zn, Mn, Fe, Cu, and Si.

The thickness of the negative electrode current collector 5a is preferably 5 μm or more and 20 μm or less. Thus, the weight of the negative electrode can be reduced while maintaining the strength of the negative electrode.

The negative electrode is produced by, for example, the following method. A negative electrode active material, a binder, and a conductive agent are suspended in a suitable solvent to prepare a slurry. The slurry is applied to the surface of a negative electrode current collector, followed by drying to form a negative electrode active material layer. Thereafter, the resultant layer is pressed. Alternatively, the negative electrode may be produced by forming a pellet from the negative electrode active material, the binder, and the conductive agent blended if needed, to use the pellet as the negative electrode layer, and disposing the negative electrode layer on the negative electrode current collector.

The separator 6 can be formed by, for example, a porous film such as polyethylene, polypropylene, cellulose, or polyvinylidene fluoride (PVdF), or a synthetic resin nonwoven fabric. The porous film made of polyethylene or polypropylene melts at a certain temperature and can block electric current. Consequently, safety can be improved by using these films.

As the container 2, a container made of laminate film or a metal container can be used. Examples of the shape of the container 2 include a flat type (thin type), angular type, cylinder type, coin type, button type, sheet type, lamination type shapes. The container 2 having a shape and a size corresponding to the dimensions of the battery is optionally designed. For example, containers for small-sized batteries to be mounted on portable electronic devices or containers for large-sized batteries to be mounted on, for example, two- to four-wheel vehicles are used.

The laminate film is a multilayered film including a metal layer and a resin layer with which the metal layer is coated. The metal layer is preferably an aluminum foil or an aluminum alloy foil. Thus, the weight of the battery can be decreased. The resin layer reinforces the metal layer. The resin layer may be made of polymer materials such as polypropylene (PP), polyethylene (PE), nylon, or polyethylene terephthalate (PET). The thickness of the laminate film forming the container 2 is preferably 0.5 mm or less, and more preferably 0.2 mm or less. The laminate film can be molded into a desired shape by sealing through thermal fusion.

The metal container may be made of aluminum, or an aluminum alloy or the like. The aluminum alloy preferably contains an element such as Mg, Zn, or Si. When the alloy contains a transition metal such as Fe, Cu, Ni, or Cr, the amount of transition metal is preferably 1% by mass or less. Thus, the long-term reliability under the high temperature and heat releasing property can be dramatically improved. The thickness of a metal plate forming the metal container is preferably 1 mm or less, more preferably 0.5 mm or less, and still more preferably 0.2 mm or less.

As shown in FIG. 1, near the peripheral edge of the electrode group 1, a positive electrode terminal 7 is connected to a positive electrode current collector 3a. A negative electrode terminal 8 is connected to the negative electrode current collector 5a at the outermost periphery of the electrode group 3. The positive electrode terminal 7 and the negative electrode terminal 8 are respectively extended to outside through an opening of the container 2.

The positive electrode terminal 7 is preferably made of Al or an aluminum alloy containing at least one element selected from Mg, Ti, Zn, Ni, Cr, Mn, Fe, Cu, and Si. The positive electrode terminal 7 is preferably made of the same material as that of the positive electrode current collector 3a to reduce the contact resistance with the positive electrode current collector 3a.

The negative electrode terminal 8 contains Al or an aluminum alloy containing at least one element selected from Mg, Ti, Zn, Mn, Fe, Cu, and Si. The negative electrode terminal 8 is preferably made of the same material as that of the negative electrode current collector 5a to reduce the contact resistance with the negative electrode current collector 5a.

As the nonaqueous electrolyte, a liquid nonaqueous electrolyte or a gel-like nonaqueous electrolyte can be used. The liquid nonaqueous electrolyte is prepared by dissolving an electrolyte in an organic solvent. The gel-like nonaqueous electrolyte is prepared by forming a composite of a liquid electrolyte and a polymer material.

The concentration of electrolyte in the liquid nonaqueous electrolyte is preferably 0.5 mol/L or more and 2.5 mol/L or less.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], and mixtures thereof. The electrolyte is preferably one which is not easily oxidized even at a high potential and $LiPF_6$ is the most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoethane (DEE); and γ-butyrolactone (GBL), acetonitrile (AN), and sulfolane (SL). These organic solvents can be used singly or as a mixed solvent thereof.

Examples of the polymer material include polyvinylidene fluoride (PVdF), polyacrylonitrile (PAN), and polyethylene oxide (PEO).

Alternatively, an ordinary-temperature molten salt (ionic melt) containing lithium ions may be used as the nonaqueous electrolyte. The ordinary-temperature molten salt means a compound which can exist as a liquid at ordinary temperature (15 to 25° C.) among organic salts including combinations of organic cations and anions. The ordinary-temperature molten salt includes an ordinary-temperature molten salt existing alone as a liquid, an ordinary-temperature molten salt serving as a liquid when the ordinary-temperature molten salt is mixed with an electrolyte, and an ordinary-temperature molten salt serving as a liquid when the ordinary-temperature molten salt is dissolved in an organic solvent.

In the present embodiment, the nonaqueous electrolyte contains carbon monoxide (CO) and at least one selected from difluorophosphoric acid ($POF_2(OH)$) and monofluorophosphoric acid ($POF(OH)_2$). In the nonaqueous electrolyte, the ratio of the mass concentration of carbon monoxide to the sum of the mass concentrations of difluorophosphoric acid and monofluorophosphoric acid is in the range of 0.1 to 5%.

When the nonaqueous electrolyte contains the carbon monoxide and the at least one selected from the difluorophosphoric acid and the monofluorophosphoric acid, at the above ratio, the generation of the gas and the deterioration of the capacity of the battery can be suppressed.

When the above ratio is less than 0.1%, the amount of difluorophosphoric acid and monofluorophosphoric acid is excessive in relation to the amount of carbon monoxide. This causes an increase in the resistance of the battery. When the above ratio is more than 5%, the amount of difluorophosphoric acid and monofluorophosphoric acid is insufficient in relation to the amount of carbon monoxide. Therefore, an effect of suppressing the generation of the gas is insufficiently.

The above ratio is more preferably in the range of 0.15 to 1%.

The difluorophosphoric acid and the monofluorophosphoric acid may be any form of an acid and a salt. They are preferably in the acid form because the acid doesn't inhibit the reaction of the battery.

The cation of a difluorophosphate and a monofluorophosphate may be Li, Na, K, Ca, and Mg or the like, for example. The cation is preferably Li because Li doesn't inhibit the reaction of the battery.

Only any one of the difluorophosphoric acid and the monofluorophosphoric acid may be contained. Alternatively, both the difluorophosphoric acid and the monofluorophosphoric acid may be contained.

When the battery is in the highly charged state, the positive electrode has a high potential, so that a self-discharge is caused on the surface of the positive electrode. Accordingly, the oxidation reaction of the nonaqueous electrolyte is caused on the surface of the positive electrode. The oxidation reaction decomposes a part of a solvent, an electrolyte (that is, a supporting salt), and other impurities (for example, water, lower alcohol, and NMP, or the like) in the nonaqueous electrolyte to generate oxidized gases such as carbon dioxide. When a large amount of gas is generated, the battery is swollen to bring about expansion of a space between electrode layers. As a result, the resistance of the battery is increased and thereby a capacity is decreased. The phenomenon is remarkable in a highly charged state, for example, in the state where charge (SOC) is 50% or more, particularly under a high-temperature environment.

However, according to the present embodiment, the nonaqueous electrolyte contains the carbon monoxide and at least one of the difluorophosphoric acid and the monofluorophosphoric acid, and the ratios of these concentrations are further set within the above range. Thereby, the generation of the gas and the increase in the resistance can be suppressed. As a result, the decrease in the capacity can be suppressed.

The carbon monoxide contained in the nonaqueous electrolyte is oxidized on the surface of the positive electrode to form carbon dioxide. Because the oxidation reaction consumes the self-discharge energy of the positive electrode, the generation of the gas caused by the decomposition of the nonaqueous electrolyte is suppressed. The carbon dioxide produced on the surface of the positive electrode is reduced on the surface of the negative electrode to form carbon monoxide. The carbon monoxide is oxidized again on the surface of the positive electrode to form carbon dioxide. Thus, the carbon monoxide circulates between the electrodes, and thereby the decomposition reaction of the nonaqueous electrolyte is suppressed.

The circulation of the carbon monoxide is promoted in the presence of the difluorophosphoric acid and/or the monofluorophosphoric acid. When the difluorophosphoric acid and/or the monofluorophosphoric acid do not exist, the oxidation reaction of the carbon monoxide is not promoted, and the decomposition reaction of an electrolyte solution is caused. Therefore, the generation of the gas is not suppressed.

For example, when the nonaqueous electrolyte is decomposed to generate a large amount of carbon dioxide, the concentration of carbon dioxide in the nonaqueous electrolyte is increased. Thus, the speed of the oxidation reaction of the carbon monoxide is decreased. The carbon dioxide which is not dissolved in the electrolyte is gasified, which causes the swollenness of the battery. Accordingly, the resistance is increased, which causes the decrease in the capacity of the battery.

However, according to the present embodiment, the amount of carbon monoxide contained in the nonaqueous electrolyte is a minute amount. Thus, the amount of carbon dioxide generated by the oxidization is also a minute amount. Consequently, the carbon dioxide is dissolved in the electrolyte and hardly gasified.

When the ratio of the mass concentration of carbon monoxide to the sum of the mass concentrations of difluorophosphoric acid and monofluorophosphoric acid is within the above range, the circulation of the carbon monoxide described above is effectively promoted. The ratio of the concentration is hardly changed regardless of SOC. The ratio is hardly changed after charge and discharge actions.

The effect of promoting the circulation of the carbon monoxide by using the difluorophosphoric acid and the monofluorophosphoric acid can be obtained in the battery including the titanium-containing oxide as the negative electrode active material.

In the titanium-containing oxide, the insertion of lithium ion occurs at a potential higher than 1 V (vs. Li/Li$^+$). Therefore, the reduction reaction is hardly caused on the surface of the negative electrode. Consequently, the difluorophosphoric acid, the monofluorophosphoric acid, and the carbon monoxide or the like in the electrolyte solution is not easily consumed.

On the other hand, in the negative electrode using a carbonaceous material, the difluorophosphoric acid and the monofluorophosphoric acid are consumed to form a coating. In the negative electrode using lithium or the like, the difluorophosphoric acid and the monofluorophosphoric acid are decomposed. Consequently, the difluorophosphoric acid and the monofluorophosphoric acid can't remain in the electrolyte in the battery. Therefore, the oxidation reaction of the carbon monoxide is not promoted.

However, the difluorophosphoric acid and the monofluorophosphoric acid can remain in the nonaqueous electrolyte by using the titanium-containing oxide as the negative electrode active material.

The effect of promoting the oxidation reaction of the carbon monoxide by the difluorophosphoric acid and the monofluorophosphoric acid is considered to be caused by the formation of an oxidation reactant by reacting of the carbon monoxide with the difluorophosphoric acid and the monofluorophosphoric acid on the positive electrode, in addition to the usual oxidation reaction of the carbon monoxide. Thus, the self-discharge reaction of the positive electrode further progresses. As a result, the decomposition of the electrolyte solution is suppressed.

The ratio of the sum of the masses of the difluorophosphoric acid and the monofluorophosphoric acid to the mass of the nonaqueous electrolyte is preferably in the range of 1000 to 50000 ppm. When the above ratio is 1000 ppm or more, the circulation of the carbon monoxide is effectively promoted. When the above ratio is 50000 ppm or less, the property of the electrolyte solution is not changed.

The ratio of the mass of carbon monoxide to that of nonaqueous electrolyte is preferably in the range of 5 to 100 ppm. When the above mass concentration is 5 ppm or more, the oxidation reaction of the carbon monoxide on the surface of the positive electrode can be effectively promoted. When the above mass concentration is 100 ppm or less, the amount of carbon monoxide to be gasified is small. According to the embodiment, the mass concentration of carbon monoxide is within the above range even after the nonaqueous electrolyte battery is charged/discharged.

The concentrations of difluorophosphoric acid and monofluorophosphoric acid can be measured by liquid chromatograph mass spectrometry (LC/MS). The LC/MS measurement is performed as follows, for example.

First, the battery is disassembled in an inert gas atmosphere other than carbon dioxide. A part of the nonaqueous electrolyte is collected, and the collected nonaqueous electrolyte is used as a sample. For example, the battery is disassembled in a glove box including an argon atmosphere. Then, the electrolyte solution contained in the electrode group is collected. The nonaqueous electrolyte may be diluted appropriately with acetone and methylethyl carbonate or the like.

Thereafter, the sample is introduced into an apparatus with the inert gas atmosphere maintained. The humidity of the inert gas atmosphere is managed so as to prevent the adsorption of water to the sample. For example, the dew point of the inert gas atmosphere is set to −50° C. or less. In order to prevent the adsorption of the carbon dioxide and the water to the sample while the sample is collected and measured, a predetermined atmosphere is maintained with caution. Next, the difluorophosphoric acid or monofluorophosphoric acid solution is diluted with the same solvent, and an analytical curve is produced. The concentration of difluorophosphoric acid or monofluorophosphoric acid is determined from comparison with the analytical curve.

The concentration of carbon monoxide can be measured by gas chromatography (GC). The GC measurement is performed as follows, for example.

The nonaqueous electrolyte is directly extracted using a microsyringe under an inert gas atmosphere other than carbon dioxide, and the extracted nonaqueous electrolyte is used as a sample. The sample is heated for 1 minute at 200° C., and the generated carbon monoxide is measured.

According to the above embodiment, there is provided a nonaqueous electrolyte secondary battery in which the generation of gas is suppressed even in the highly charged state, and which has an excellent capacity maintenance ratio.

Second Embodiment

Next, a method for manufacturing a nonaqueous electrolyte secondary battery in the first embodiment will be described.

<First Manufacturing Method>

A first manufacturing method of a nonaqueous electrolyte secondary battery will be described. The first manufacturing method includes the steps of: preparing a nonaqueous electrolyte under an inert gas atmosphere excluding carbon dioxide; dissolving at least one selected from difluorophosphoric acid, monofluorophosphoric acid, and salts thereof in the nonaqueous electrolyte under the inert gas atmosphere; adjusting a mass concentration of carbon monoxide in the nonaqueous electrolyte to the range of 0.1 to 5% based on a sum of mass concentrations of difluorophosphoric acid and monofluorophosphoric acid under the inert gas atmosphere;

and assembling the nonaqueous electrolyte secondary battery using the nonaqueous electrolyte.

First, an electrolyte is dissolved in a suitable solvent to prepare a nonaqueous electrolyte solution. Next, at least one selected from the difluorophosphoric acid, the monofluorophosphoric acid, and the salts thereof is dissolved in the nonaqueous electrolyte solution. The ratio of the sum of the masses of the difluorophosphoric acid and the monofluorophosphoric acid to the mass of the nonaqueous electrolyte solution is preferably 1000 ppm or more and 50000 ppm or less. A concentration is confirmed by LC/MS measurement after the dissolution.

Next, the mass concentration of carbon monoxide in the nonaqueous electrolyte is adjusted to the range of 0.1 to 5% based on the sum of the mass concentrations of difluorophosphoric acid and monofluorophosphoric acid.

The mass concentration of carbon monoxide can be adjusted by aerating an inert gas excluding carbon dioxide or the carbon monoxide into the nonaqueous electrolyte solution. The carbon monoxide is bubbled in order to increase the concentration of carbon monoxide is increased. Conversely, the inert gas is bubbled in order to decrease the concentration of carbon monoxide. The concentration of carbon monoxide can be adjusted by changing the flow rate of the gas in aerating, the aerating time, and the amount of nonaqueous electrolyte solution.

After aerating, the concentration of carbon monoxide is confirmed by GC measurement. When the concentration of carbon monoxide in the nonaqueous electrolyte solution in which the difluorophosphoric acid and/or the monofluorophosphoric acid are/is dissolved is more than 100 ppm, the aerating may be omitted.

The ratio of the mass of carbon monoxide to that of nonaqueous electrolyte solution is preferably 5 ppm or more and 100 ppm or less.

The above operation is performed under an inert gas atmosphere in order to prevent the nonaqueous electrolyte solution from absorbing the carbon dioxide in the atmosphere. For example, argon and nitrogen or the like can be used as the inert gas. The operation is preferably performed while the dew point is managed in order to prevent the nonaqueous electrolyte solution from absorbing water in the atmosphere. The dew point is preferably set to −30° C. or less, for example.

The nonaqueous electrolyte secondary battery is assembled using the nonaqueous electrolyte solution adjusted as described above.

In the First manufacturing method, furthermore, the concentration of carbon monoxide may be adjusted by aging the assembled nonaqueous electrolyte secondary battery and thereafter decompressing the nonaqueous electrolyte secondary battery.

<Second Manufacturing Method>

Next, a second manufacturing method of a nonaqueous electrolyte secondary battery will be described. The second manufacturing method includes the steps of: preparing a nonaqueous electrolyte under an inert gas atmosphere excluding carbon dioxide; dissolving raw materials of at least one of difluorophosphoric acid and monofluorophosphoric acid in the nonaqueous electrolyte under the inert gas atmosphere; assembling a temporarily sealed battery using the nonaqueous electrolyte under the inert gas atmosphere; storing the temporarily sealed battery at high temperature to generate at least one of the difluorophosphoric acid and the monofluorophosphoric acid in the nonaqueous electrolyte; adjusting a mass concentration of carbon monoxide in the nonaqueous electrolyte to the range of 0.1 to 5% based on a sum of mass concentrations of difluorophosphoric acid and monofluorophosphoric acid; and permanently sealing the temporarily sealed battery.

First, an electrolyte is dissolved in a suitable solvent to prepare a nonaqueous electrolyte solution. Next, raw materials of at least one of the difluorophosphoric acid and the monofluorophosphoric acid are dissolved in the nonaqueous electrolyte solution. Herein, the raw materials refer to substances generating the difluorophosphoric acid or the monofluorophosphoric acid according to a chemical reaction. Examples of the raw materials include, but are not limited to, $LiPF_6$ and water.

The concentration of $LiPF_6$ is in the range of 0.01 to 2.0 mol/L in the nonaqueous electrolyte solution, for example. When the concentration is 0.01 mol/L or more, a sufficient amount of difluorophosphoric acid is generated. When the concentration is 2.0 mol/L or less, the ion conductivity of the nonaqueous electrolyte is kept high.

When $LiPF_6$ is used as the electrolyte of the nonaqueous electrolyte solution, the procedure can be omitted by increasing the additive amount of $LiPF_6$.

Next, the temporarily sealed battery is assembled using the nonaqueous electrolyte solution under the inert gas atmosphere. Specifically, an electrode group is accommodated in a container, and the nonaqueous electrolyte solution is injected into the container. Thereafter, the container is temporarily sealed.

Next, the temporarily sealed battery is stored at high temperature for ageing. When the temporarily sealed battery is stored under the high temperature, a part of $LiPF_6$ is hydrolyzed, and thus, at least one of the difluorophosphoric acid and the monofluorophosphoric acid is generated. The concentrations thereof can be adjusted by changing the amount of the raw material, storage temperature, and storage time or the like. The ratio of the sum of the masses of the difluorophosphoric acid and the monofluorophosphoric acid to the mass of the nonaqueous electrolyte solution is preferably in the range of 1000 to 50000 ppm.

Next, the mass concentration of carbon monoxide in the nonaqueous electrolyte solution is adjusted to the range of 0.1 to 5% based on the sum of the mass concentrations of difluorophosphoric acid and monofluorophosphoric acid. This can be performed by decompressing the inside of the temporarily sealed battery after aging to remove the carbon monoxide. The ratio of the mass of carbon monoxide to that of nonaqueous electrolyte solution is preferably in the range of 5 to 100 ppm.

Thereafter, the nonaqueous electrolyte secondary battery is obtained by permanently sealing the temporarily sealed battery.

The generation of at least one of the difluorophosphoric acid and the monofluorophosphoric acid by the above aging may be performed in the nonaqueous electrolyte solution before being injected into the container.

The above operation is performed under an inert gas atmosphere in order to prevent the nonaqueous electrolyte solution from absorbing the carbon dioxide in the atmosphere. For example, argon and nitrogen or the like can be used as the inert gas. The operation is preferably performed while the dew point is managed in order to prevent the nonaqueous electrolyte solution from absorbing water in the atmosphere. The dew point is preferably set to −30° C. or less, for example.

According to the embodiment, there is provided the manufacturing method of the nonaqueous electrolyte secondary battery in which the generation of gas is suppressed even in the highly charged state, and which has an excellent capacity maintenance ratio.

EXAMPLES

Example 1

Production of Negative Electrode

A powder of a lithium-titanium oxide ($Li_4Ti_5O_{12}$) having a spinel structure was used as a negative electrode active material. There was prepared a mixture for the negative electrode containing 85 parts by mass of a negative electrode active material, 5 parts by mass of graphite as a conductive agent, 3 parts by mass of acetylene black, and 5 parts by mass of PVdF as a binder. The mixture was added to N-methylpyrrolidone (NMP) to prepare a slurry. In the preparation of the slurry, dispersion was carried out using zirconia beads for 2 hours under an atmosphere of which a carbon dioxide concentration was 0.02% and the dew point was −13° C. The slurry was applied to both surfaces of an aluminum foil (current collector) having a thickness of 15 μm. Then, the slurry was dried, and thereafter pressed.

<Production of Positive Electrode>

A powder made of a lithium nickel cobalt composite oxide ($LiNi_{0.8}Co_{0.2}O_2$) was used as a positive electrode active material. There was prepared a mixture for the positive electrode containing 91 parts by mass of a positive electrode active material, 2.5 parts by mass of acetylene black, 3 parts by mass of graphite, and 3.5 part by mass of polyvinylidene fluoride (PVdF). The mixture was added to NMP to prepare a slurry. In the preparation of the slurry, dispersion was carried out using zirconia beads for 2 hours under an atmosphere of which a carbon dioxide concentration was 0.02% and the dew point was −13° C. The slurry was applied to both surfaces of an aluminum foil (current collector) having a thickness of 15 μm. Then, the slurry was dried, and thereafter pressed.

<Production of Electrode Group>

The positive electrode produced above, a separator made of a polyethylene porous film having a thickness of 20 μm, the negative electrode produced above, and the separator were laminated in this order to obtain a laminated product. The laminated product was spirally wound so that the negative electrode is located at the outermost periphery to produce an electrode group. This was hot-pressed at 90° C. to produce a flat-type electrode group having a width of 58 mm, a height of 95 mm, and a thickness of 3.0 mm.

<Production of Nonaqueous Electrolyte Solution>

A mixed solvent was prepared by mixing ethylene carbonate (EC) and methylethyl carbonate (MEC) at a volume ratio of 1:2. A nonaqueous electrolyte solution was prepared by dissolving 1.0 mol/L of lithium hexafluorophosphate ($LiPF_6$) in the mixed solvent.

A difluorophosphoric acid ($POF_2(OH)$) solution was added to the prepared nonaqueous electrolyte solution and mixed. The amount of added difluorophosphoric acid solution was 1% based to the mass of the prepared nonaqueous electrolyte solution. A part of the mixed solution was subjected to LC/MS measurement. The measured value thus obtained was converted to a value for concentration. As a result, the concentration of difluorophosphoric acid was 9700 ppm.

Next, the concentration of carbon monoxide in the mixed solution was measured in the same way as described above. As a result, the concentration of carbon monoxide was more than 100 ppm. Thus, gaseous argon was aerated in the mixed solution. The aerating was performed at a flow rate of 50 mL/min based on 100 mL of the mixed solution for 1 hour. Thereafter, the concentration of carbon monoxide in the mixed solution was measured again. As a result, the concentration of carbon monoxide was 32 ppm. The ratio of the concentration of carbon monoxide to that of difluorophosphoric acid was 0.33%.

The nonaqueous electrolyte solution was prepared under an argon atmosphere having a dew point of −50° C.

<Production of Battery>

The electrode group obtained as described above was accommodated in a container made of a laminate film and vacuum-dried at 80° C. for 24 hours. The laminate film was composed of an aluminum foil having a thickness of 40 μm and polypropylene layers formed on each surface of the aluminum foil. The laminate film had a thickness of 0.1 mm.

The nonaqueous electrolyte solution prepared as described above was injected into the container accommodating the electrode group, and sealed to produce a nonaqueous electrolyte secondary battery. The battery had a capacity of 3 Ah.

Examples 2 to 8

Batteries were produced in the same manner as the method in Example 1 except that the amounts of difluorophosphoric acids added to nonaqueous electrolyte solutions and the concentrations of carbon monoxides were changed as shown in Table 1. The concentrations of difluorophosphoric acids and the ratios of the concentrations of carbon monoxides thereto are shown in Table 1.

Example 9

A mixed solvent was prepared by mixing ethylene carbonate (EC) and methylethyl carbonate (MEC) at a volume ratio of 1:2. A nonaqueous electrolyte solution was prepared by dissolving 1.0 mol/L of lithium hexafluorophosphate ($LiPF_6$) in the mixed solvent. Water was mixed to the nonaqueous electrolyte solution to adjust the water content to 3000 ppm.

The electrode group produced by the same method as that of Example 1 was accommodated in the same container as that of Example 1, and vacuum-dried at 80° C. for 24 hours.

The nonaqueous electrolyte solution prepared as described above was injected into the container accommodating the electrode group, and temporarily sealed to produce a temporarily sealed battery. The temporarily sealed battery was subjected to one cycle of charge and discharge actions at 0.2 C rate under an argon atmosphere, and then charged again to adjust the SOC to 50%. The battery was aged at 35° C. for 24 hours. After the completion of aging, a part of the nonaqueous electrolyte solution was extracted, and the concentration of difluorophosphoric acid was measured. As a result, the concentration of difluorophosphoric acid was 11700 ppm.

Next, a part of the electrolyte solution was extracted, and subjected to GC/MS measurement in order to measurement the concentration of carbon monoxide. As a result, the concentration of carbon monoxide was more than 100 ppm. Thus, the inside of the temporarily sealed battery was decompressed. After the decompression, the concentration of carbon monoxide was measured again. As a result, the concentration of carbon monoxide was 39 ppm. The ratio of the concentration of carbon monoxide to that of difluorophosphoric acid was 0.33%.

Thereafter, the temporarily sealed battery was permanently sealed to produce a nonaqueous electrolyte secondary battery.

Comparative Example 1

A mixed solvent was prepared by mixing ethylene carbonate (EC) and methylethyl carbonate (MEC) at a volume ratio of 1:2. A nonaqueous electrolyte solution was prepared by dissolving 1.0 mol/L of lithium hexafluorophosphate (LiPF$_6$) in the mixed solvent. A nonaqueous electrolyte secondary battery was produced in the same manner as in the method described in Example 1 except that the nonaqueous electrolyte solution was used.

Comparative Examples 2 to 4

Batteries were produced in the same manner as in the method in Example 1 except that the amounts of difluorophosphoric acids added to nonaqueous electrolyte solutions and the concentrations of carbon monoxides were changed as shown in Table 1. The concentrations of difluorophosphoric acids and the ratios of the concentrations of carbon monoxides thereto are shown in Table 1.

(Life Test)

The batteries according to Examples 1 to 9 and Comparative Examples 1 to 4 were subjected to one cycle of charge and discharge operations at 0.2 C rate, and then charged again to adjust the SOC to 50%. The resistance of each of the batteries at this time was measured. The value thus obtained was used as an initial resistance value. A discharge capacity was measured, and used as an initial discharge capacity. At 30° C., the thickness of each of the batteries in a state of SOC 50% was measured, and the value thus obtained was used as an initial thickness.

Thereafter, a cycle test repeating charge and discharge operations was carried out in a region of SOC of 20 to 80% at 10 C rate under an environment of 60° C. The thickness of each of the batteries after 3000 cycles was measured. The resistance value of each of the batteries after 3000 cycles was measured. Each of the batteries after 3000 cycles was subjected to one cycle of charge and discharge operations at 0.2 C rate at 30° C. to measure a discharge capacity thereof.

The ratio of the thickness after 3000 cycles to the initial thickness was calculated. The results are shown as a swelling ratio in Table 1. The ratio of the resistance value after 3000 cycles to the initial resistance was calculated. The results are shown as a resistance increasing ratio in Table 1. The ratio of the discharge capacity after 3000 cycles to the initial discharge capacity is calculated, and shown as a discharge capacity maintenance ratio in Table 1.

TABLE 1

|  | Additive amount of POF$_2$(OH) (%) | Concentration of POF$_2$(OH) (ppm) | CO concentration (ppm) | CO concentration/ POF$_2$(OH) concentration (%) | Swelling ratio | Resistance increasing ratio | Capacity maintenance ratio (%) |
|---|---|---|---|---|---|---|---|
| Example 1 | 1.0 | 9700 | 32 | 0.33 | 1.09 | 1.73 | 84 |
| Example 2 | 5.0 | 50000 | 67 | 0.13 | 1.08 | 2.19 | 80 |
| Example 3 | 0.1 | 1000 | 45 | 4.50 | 1.21 | 1.88 | 85 |
| Example 4 | 0.9 | 8800 | 100 | 1.13 | 1.33 | 1.95 | 84 |
| Example 5 | 0.3 | 3300 | 5 | 0.15 | 1.12 | 1.70 | 86 |
| Example 6 | 3.0 | 30000 | 30 | 0.10 | 1.14 | 2.11 | 81 |
| Example 7 | 0.2 | 1900 | 95 | 5.00 | 1.22 | 1.89 | 82 |
| Example 8 | 0.2 | 2100 | <3 | 0.14 | 1.32 | 2.25 | 79 |
| Example 9 | — | 11700 | 28 | 0.33 | 1.06 | 1.67 | 87 |
| Comparative Example 1 | — | 300 | 145 | 48.00 | 1.76 | 2.93 | 70 |
| Comparative Example 2 | 0.5 | 4400 | 250 | 5.68 | 1.69 | 3.23 | 64 |
| Comparative Example 3 | 0.8 | 7800 | <3 | 0.05 | 1.24 | 2.44 | 75 |
| Comparative Example 4 | 10 | 103000 | 39 | 0.04 | 1.19 | 3.78 | 62 |

Each of the batteries according to Examples 1 to 9 had a capacity maintenance ratio higher than that of each of the batteries according to Comparative Examples 1 to 4. Consequently, when the ratio of the concentration of carbon monoxide contained in the electrolyte solution to that of difluorophosphoric acid was in the range of 0.1 to 5%, it was shown that the deterioration in the capacity of the battery was suppressed.

Each of the batteries according to Examples 1 to 9 had a swelling ratio lower than that of each of the batteries according to Comparative Examples 1, 2, and 4, and had a resistance increasing ratio smaller than that of each of the batteries according to Comparative Examples 1 to 4. Consequently, it was shown that the generation of the gas was suppressed in the batteries according to Examples 1 to 9.

The batteries according to Examples 1 to 7, and 9 had a capacity maintenance ratio higher than that of the battery according to Example 8. For this reason, when a carbon monoxide concentration was 5 ppm or more, it was shown that the capacity maintenance ratio was increased.

The battery according to Example 9 exhibited a high capacity maintenance ratio, a low swelling ratio, and a low resistance increasing ratio. The battery according to Example 9 was a battery in which the ratio of the concentration of carbon monoxide contained in the nonaqueous electrolyte solution to the concentration of difluorophosphoric acid was adjusted by decompressing after aging. Consequently, it was shown that even in the battery manufactured by the method, the generation of the gas can be suppressed, thereby obtaining an effect of suppressing the deterioration of the capacity.

The batteries according to Comparative Examples 3 and 4 had a low swelling rate, but had a high resistance increasing rate and a low capacity maintenance ratio. When the nonaqueous electrolyte solution contains a large amount of difluorophosphoric acid, the excessive difluorophosphoric acid which does not contribute to the circulation reaction of the carbon monoxide causes the decrease in ion conductivity, or the like. It was considered that the influence of the excessive difluorophosphoric acid appeared remarkably in the battery after the cycle.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery comprising:
    a positive electrode;
    a negative electrode containing a titanium-containing oxide; and
    a nonaqueous electrolyte,
    wherein the nonaqueous electrolyte contains carbon monoxide and at least one selected from difluorophosphoric acid and monofluorophosphoric acid, and
    a ratio of a mass concentration of carbon monoxide to a sum of mass concentrations of difluorophosphoric acid and monofluorophosphoric acid is in the range of 0.1 to 5%.

2. The battery according to claim 1, wherein a ratio of a sum of masses of the difluorophosphoric acid and the monofluorophosphoric acid to a mass of the nonaqueous electrolyte is in the range of 1000 ppm to 50000 ppm.

3. The battery according to claim 1, wherein a ratio of a mass of carbon monoxide to that of nonaqueous electrolyte is in the range of 5 ppm to 100 ppm.

4. The battery according to claim 2, wherein a ratio of a mass of carbon monoxide to that of nonaqueous electrolyte is in the range of 5 ppm to 100 ppm.

5. A method for manufacturing a nonaqueous electrolyte secondary battery comprising:
    preparing a nonaqueous electrolyte under an inert gas atmosphere excluding carbon dioxide;
    dissolving at least one selected from difluorophosphoric acid, monofluorophosphoric acid, and salts thereof in the nonaqueous electrolyte under the inert gas atmosphere;
    adjusting a mass concentration of carbon monoxide in the nonaqueous electrolyte to the range of 0.1 to 5% based on a sum of mass concentrations of difluorophosphoric acid and monofluorophosphoric acid under the inert gas atmosphere; and
    assembling the nonaqueous electrolyte secondary battery using the nonaqueous electrolyte.

6. The method according to claim 5, wherein the mass concentration of carbon monoxide is adjusted by bubbling a gas selected from carbon monoxide and an inert gas excluding carbon dioxide in the nonaqueous electrolyte.

* * * * *